United States Patent
Jung

(10) Patent No.: US 7,239,843 B2
(45) Date of Patent: Jul. 3, 2007

(54) METHOD FOR THE INTERFERENCE-FREE COMMUNICATION DURING THE OPERATION OF A JAMMING TRANSMITTER

(75) Inventor: Markus Jung, Eicklingen (DE)

(73) Assignee: Rheinmetall W & M GmbH (DE)

( * ) Notice: Subject to any disclaimer, the term of this patent is extended or adjusted under 35 U.S.C. 154(b) by 269 days.

(21) Appl. No.: 10/830,032

(22) Filed: Apr. 23, 2004

(65) Prior Publication Data

US 2004/0214520 A1    Oct. 28, 2004

(30) Foreign Application Priority Data

Apr. 23, 2003   (DE) ................................ 103 18 475

(51) Int. Cl.
*H04K 3/00*    (2006.01)
(52) U.S. Cl. .................... 455/1; 455/114.1; 455/115.1; 455/114.2
(58) Field of Classification Search .................... 455/1, 455/114.2, 115.1, 114.1, 114.3, 115.2, 115.3, 455/115.4, 67.11, 67.13, 550.1
See application file for complete search history.

(56) References Cited

U.S. PATENT DOCUMENTS

| | | | | |
|---|---|---|---|---|
| 4,216,546 A | * | 8/1980 | Litt ......................... | 455/114.1 |
| 4,217,550 A | * | 8/1980 | Blassel et al. ................. | 455/1 |
| 4,644,299 A | * | 2/1987 | Amoroso et al. ........ | 455/115.1 |
| 5,004,185 A | * | 4/1991 | Lockhart et al. ............... | 455/1 |
| 5,822,429 A | * | 10/1998 | Casabona et al. .............. | 455/1 |
| 7,142,148 B2 | * | 11/2006 | Eneroth ......................... | 455/1 |
| 2005/0079860 A1 | * | 4/2005 | Binar ..................... | 455/114.2 |

FOREIGN PATENT DOCUMENTS

DE        199 59 358 A1       12/1999

* cited by examiner

*Primary Examiner*—Lana N. Le
(74) *Attorney, Agent, or Firm*—Venable, LLP; Michael A. Sartori; Jeffri A. Kaminski

(57) ABSTRACT

The participants of a friendly communication system use so-called time windows in the interference pattern for the communication and transmission among each other. These time windows are preset ahead of time in the communication system by the jamming transmitter or are created and/or adapted individually and short-term with the aid of software programs. Since only the communication-system participants can recognize and/or detect these time windows, they are the only ones that can receive and/or transmit corresponding information during these time windows. The information is compressed in the known manner, such that it can be transmitted and received completely during the brief time window provided. The information can then be decompressed and read during the time of interference in the known manner.

6 Claims, 1 Drawing Sheet

METHOD FOR THE INTERFERENCE-FREE COMMUNICATION DURING THE OPERATION OF A JAMMING TRANSMITTER

FIELD OF THE INVENTION

The invention relates to a method for the interference-free communication between participants of a communication system located, within the operating range of a jammer and/or jamming transmitter.

BACKGROUND OF THE INVENTION

For the non-lethal destruction of targets, explosive-driven RF (radio frequency) generators are used in addition to high-power microwave sources (HPM). The electronic components of a target are thus destroyed through the target-aimed transmission of RF rays or the operation is interfered with through dazzling or jamming, without destroying the target itself. A radiation source of this type is disclosed in reference DE 199 59 358 A1.

The problem with this type of approach is that it also interferes with the communication between participants of friendly communication systems if these are located within transmitting range of the jamming transmitter and the frequency range covered by the jamming transmitter. Shifting to frequency ranges outside of the range covered by the jamming transmitter is not the best solution as this requires new transmitting and receiving equipment. In addition, the ranges can be severely restricted for higher frequencies, for example as a result of damping, etc.

SUMMARY OF THE INVENTION

It is therefore the object of an embodiment of the present invention to specify a method which makes it possible to have communication within friendly communication systems despite the operation of a jammer and/or jamming transmitter. Embodiments of the invention designed to secure communication during the operation of UWB (ultra-wide) broad-band jamming transmitters.

From the telecommunications field, it is known that a time window for transmission and reception is assigned to a mobile telephone which logs onto a base station. For this, data is transmitted in compressed form at specific time intervals, which are agreed upon by transmitter and receiver. The base station automatically assigns the time window, which is detected by the mobile telephone. A so-called communication chip can be self-programmed to perform these functions.

Embodiments of the invention are based on the idea of providing the participants of a communication system with so-called time windows for the communication between participants and their transmissions during the operation of a friendly jammer, similarly as for a mobile telephone. These time windows are specified ahead of time in the communication system, e.g. with the aid of the jamming transmitter, or are individually created and/or adapted for the short term with the aid of software programs. Since only the communicating participants know and/or recognize these time windows, they are the only ones to receive and/or transmit corresponding data during these time windows. The data are compressed in a known manner, so that they can be transmitted and received as a whole during the short period assigned to the time windows. During the jamming operation, these data can then be decompressed and read out in the same manner.

Friendly forces are thus provided with the option of maintaining radio communication in the frequency range of the jamming transmitter through modification of the transmitting and receiving behavior in time.

The time windows in the time period used for friendly communication are preferably created through synchronizing the jamming signal and the transmitting signal in time, which cannot be anticipated and therefore can also not be utilized by the communication systems to be jammed. Friendly communication systems transmit the data with a type of time compression and the synchronization ensures that friendly communication systems, which are attuned in time to the transmitted jamming pattern agreed upon with the jamming transmitter, can continue to communicate with each other.

The jamming transmitter can transmit a fixed, repetitive interference pattern with high pulse repetition rate, wherein the participants of a friendly communication system analyze the progression in time and then transmit during the provided time gaps. The communication participants of the friendly communication system preferably inform each other of these time gaps, so that the participants can receive and transmit signals during the time gaps provided for the friendly transmission.

According to another option, the jamming transmitter contacts the other communication participants prior to the start of the transmission of the interference pulse and coordinates these time gaps with the other participants.

One advantage of this embodiment of the invention is that existing transmitting frequencies with known ranges can continue to be used. In addition, the interference pattern can be modified at any time to ensure that enemy communication systems are jammed.

The synchronizing with the jamming transmitter can be achieved with an additional module and/or through modification of a communication chip installed in a friendly communication participant. Communication chips of this type are programmable, are known from the mobile phone technology and are used, for example, in devices by the companies Motorola, Ericsson or Siemens.

BRIEF DESCRIPTION OF THE FIGURES

The method is to be explained briefly with the aid of a diagrammatic representation; wherein the FIGURE is a schematic diagram of a communication system.

DETAILED DESCRIPTION OF THE PREFERRED EMBODIMENT

Figure 1:
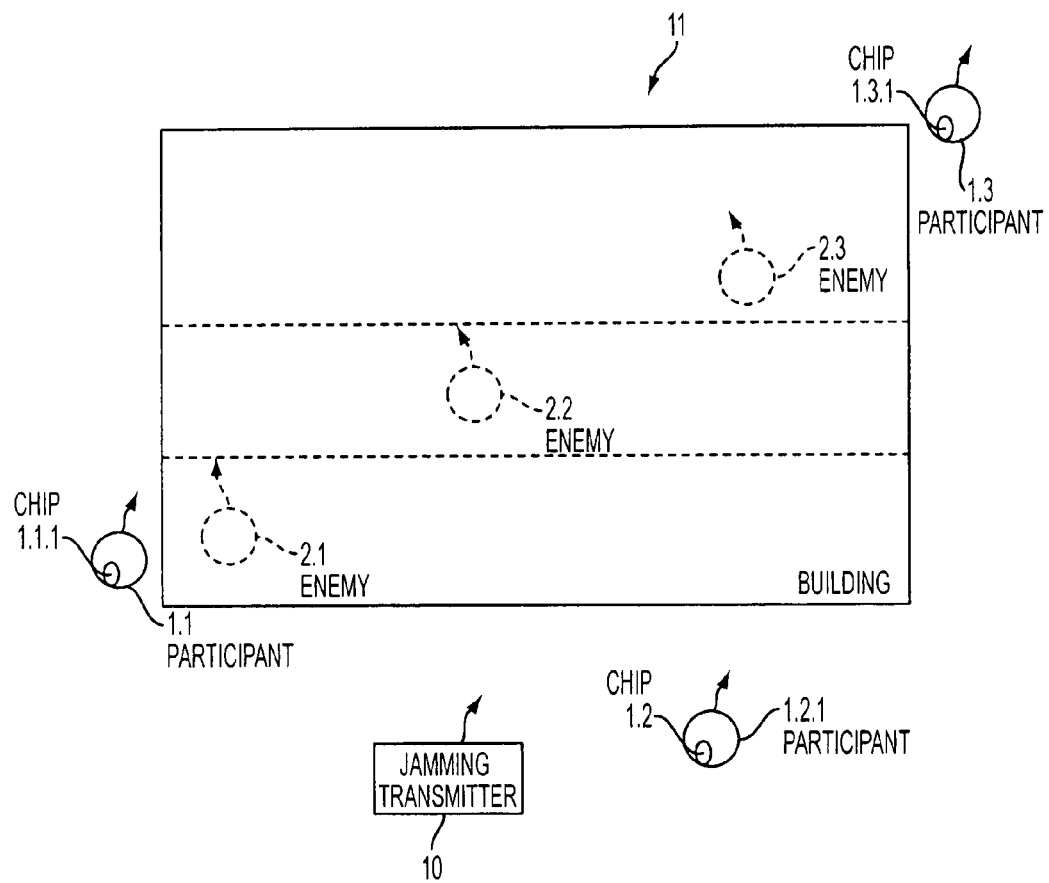

A first communication system is formed by several communication participants 1.1, 1.2, 1.3 (to 1.n) which are located inside a building/house 11 or in an outside area, shown herein, while additional, enemy communication devices 2.1, 2.2, 2.3 (to 2.n) form a second communication system. A jamming transmitter with reference 10 operates within the range of both the first and second communication systems and belongs to the first communication system.

The jamming transmitter 10, an UWB (ultrawide) broad-band jamming transmitter, transmits a short pulse, (for example a pulse with a pulse width ~1 ns, with a pulse repetition rate of several MHz, which for the first and second communication systems leads to a noise level that is clearly above the actual signal level. Thus, reception by the first and second communication systems is not possible within the range of the jamming transmitter.

By omitting interference pulses or variations in the pulse repetition rate in the interference pattern of the jamming transmitter 10, time windows are created for friendly communication within the first communication system, which cannot be anticipated by the enemy communication system.

Synchronizing and/or adapting the transmitting/receiving frequencies between the jamming transmitter 10 and friendly communication participants 1.1, 1.2, 1.3 to these interference windows of the jamming transmitter 1 creates the option of communication in the friendly system and can be realized by means of a supplemental component 1.11, 1.21, 1.31 and/or a modification using a communication chip in the friendly communication participants 1.1, 1.2, 1.3.

In addition, the friendly data are compressed in the smaller time window as compared to normal communication. This can be achieved, for example, through increasing the clock frequency and/or the transmission band width. For example, a signal with a band width of 5 kHz and a time length of 1 μs is then transmitted with a band width of 50 kHz and a time length of 100 ns.

The participants of the friendly communication systems 1.1, 1.2, 1.3 are advantageously connected to the antenna only during the time window specified for the transmission, thus making it possible to avoid overdrives caused by the jamming transmitter 10. The participants are preferably connected and/or disconnected with the aid of a switch that is triggered with the coding which is also used to determine the time windows.

The invention claimed is:

1. A method for generating communication between several participants of a communication system during the operation of at least one jamming transmitter, which belongs to the communication system, comprising:

synchronizing an interference signal from the at least one jamming transmitter and a transmitting signal from the participants in time;

communicating the transmitting signal between the participants during time windows jointly agreed to with the jamming transmitter and created by the time interference signal; and increasing a clock rate and/or the transmission band width to compress the transmitting signal.

2. The method according to claim 1, further comprising analyzing by the participants a fixed, repetitive interference pattern transmitted by the jamming transmitter to detect the time windows in which the participants can communicate.

3. The method according to claim 2, wherein the participants inform each other of the time windows.

4. The method according to claim 1, further comprising contacting the participants with the jamming transmitter prior to transmitting the interference signal and agreeing on the time windows for the interference operation.

5. The method according to claim 1, wherein the interference signal can be modified during jamming.

6. A communication method comprising:

generating an interference signal including time gaps therein with a jamming transmitter;

communicating a location of the time gaps between the jamming transmitter and a plurality of participants in a communication system; and increasing a clock rate and/or the transmission band width to compress the transmitting signal sending and receiving transmission signals between the participants during the time gaps.

* * * * *